TELEPHONE PARTY LINE CLEARING COMPONENT

Filed Aug. 28, 1959 2 Sheets-Sheet 1

INVENTOR.
LELAND B. POPEJOY
BY
Patrick D. Beavers
ATTY.

June 25, 1963 L. B. POPEJOY 3,095,480

TELEPHONE PARTY LINE CLEARING COMPONENT

Filed Aug. 28, 1959 2 Sheets-Sheet 2

INVENTOR.
LELAND B. POPEJOY
BY
Patrick D. Beavers
ATTY.

United States Patent Office 3,095,480

Patented June 25, 1963

3,095,480

TELEPHONE PARTY LINE CLEARING COMPONENT

Leland B. Popejoy, 2620 Princeton St., North Sacramento 15, Calif.

Filed Aug. 28, 1959, Ser. No. 836,801

1 Claim. (Cl. 179—32)

This invention relates to improvements in line clearing circuit components that are used with telephone party lines and more particularly to a device for restoring service to the remaining subscribers on a party line in the event one subscriber has inadvertently left the receiver off the hook.

An object of this invention, therefore, is to provide a line clearing circuit component that will restore service to a party line when one of the subscribers has created a receiver-off-hook condition at an unknown and inaccessible location.

It is a well known fact that when a receiver or handset is not returned to the hook, a busy signal will result any time that contact is attempted to be made with the subscriber's line. The party line involved is, therefore, not available to incoming calls from other lines or to outgoing calls from stations on the same line. The telephone company can locate such a condition only with considerable difficulty and, when located, must send a service man to correct the existing receiver-off-hook condition.

Another object of the invention is to provide a line clearing circuit component which not only locates the particular receiver or handset, but will render such receiver or handset out of service so that the other subscribers may make and receive phone calls without the usual busy signal that accompanies such a condition.

A further object of the invention is to provide a fused line in the circuit which may be blown intentionally to render the line disconnected and to permit the other subscribers to use the same.

Figure 1:
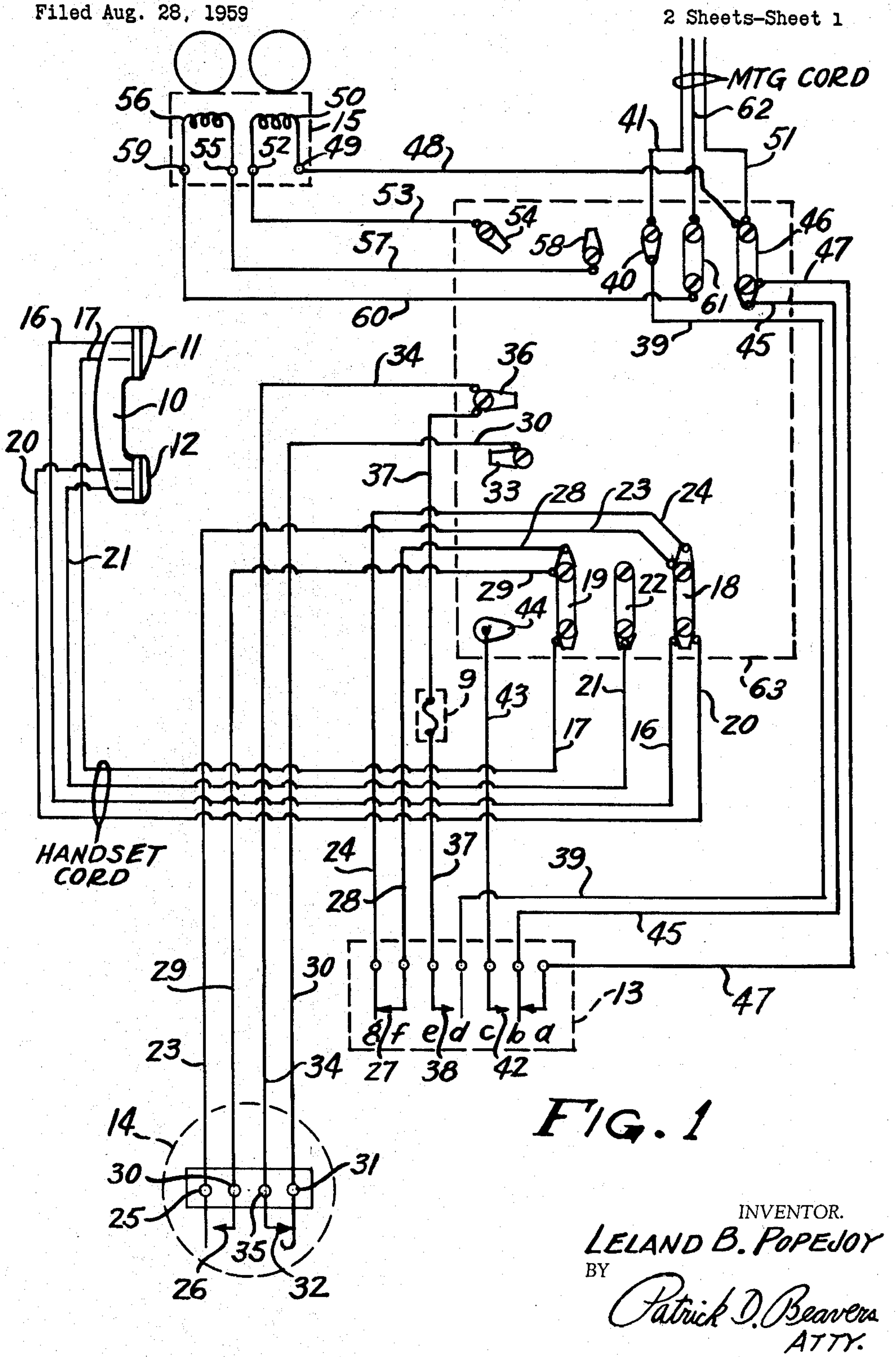
Figure 2:
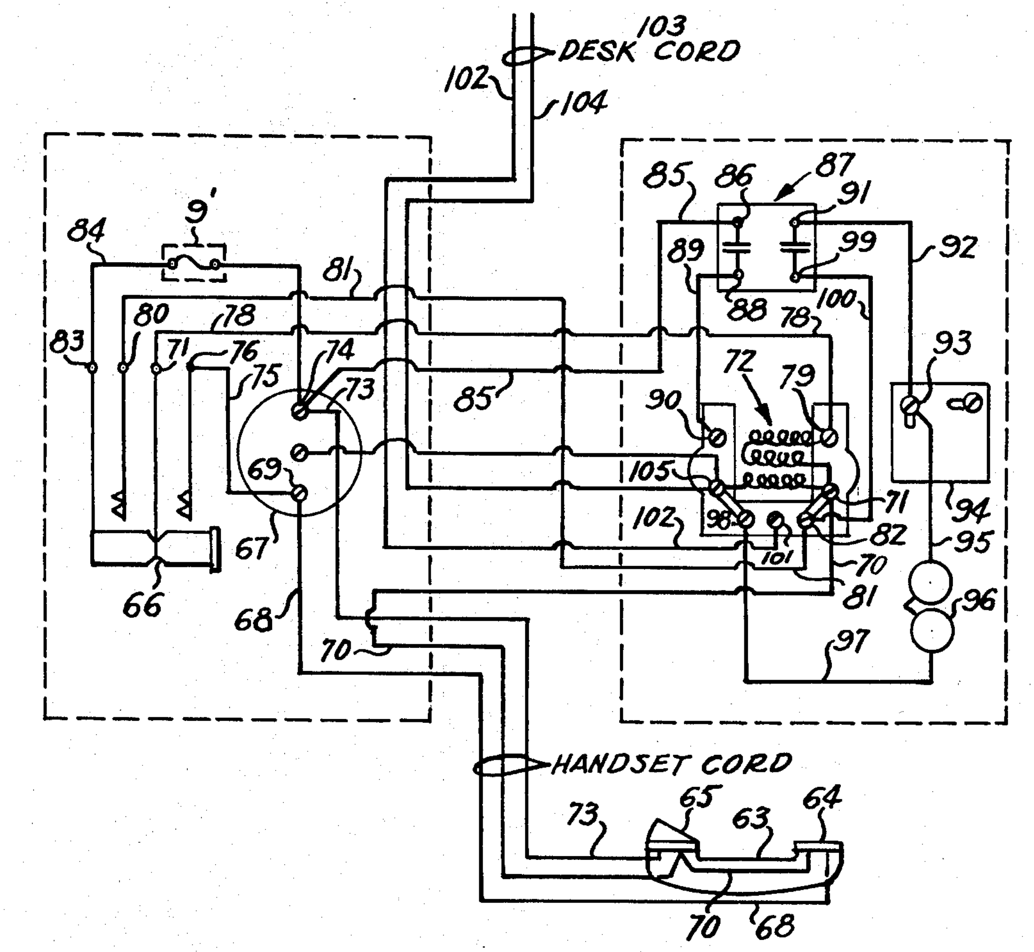

With the above and other objects and advantages in view, the invention consists of the novel details of construction, arrangement and combination of parts more fully hereinafter described, claimed and illustrated in the accompanying drawings, in which:

FIG. 1 is a diagrammatical view illustrating one type of wiring diagram for a telephone party line; and, FIG. 2 is a diagrammatical view illustrating a second type of wiring diagram for a telephone party line.

Referring more in detail to the drawings, wherein like parts are designated by like reference numerals and more particularly to FIG. 1, the reference numeral 10 is here used to designate a hand set which is used in all types of telephone party lines.

The hand set 10 has a receiving end 11 and a transmitting end 12. A support 13, which has the usual cradle (not shown) for the hand set 10, also has a dial 14 and a ringer 15 which is conventional for telephone service lines.

Conductors 16 and 17 extend from the receiving end 11 of the hand set 10 to terminal block 18 and terminal block 19, respectively. Also conductors 20 and 21 extend from the transmitting end 12 to terminal block 18 and terminal block 22, respectively.

Extending from the terminal block 18 there are a pair of conductors 23 and 24, conductor 23 benig connected to a fixed terminal 25 of a switch 26 that is associated with the dial 14, and conductor 24 being connected to a fixed terminal *g* of a switch 27 of the support 13.

A pair of conductors 28 and 29 extend from the terminal block 19 to movable contact terminal *f* in the support 13 and movable contact terminal 30 of the switch 26 of the dial 14.

A conductor 30' extends from the fixed terminal 31 of a switch 32 of the dial 14 to terminal block 33 and a conductor 34 extends from movable contact 35 of the switch 32 of the dial 14 to terminal block 36. Extending from the terminal block 36 there is a conductor 37 that is connected to movable contact *e* of a switch 38 and a fuse 9 of low ampere rating is interposed in this conductor. Fixed contact *d* of the switch 38 in the support 13 is connected by a conductor 39 to terminal block 40, which in turn has a conductor 41 of a MTG cord connected thereto. A first movable contact *c* of a switch 42 is connected by a conductor 43 to terminal 44. The switch 42 has a fixed terminal *b* which is connected by a conductor 45 to terminal block 46 and a second movable contact *a* that is connected by a conductor 47 to terminal block 46.

Terminal block 46 is connected by a conductor 48 to terminal 49 of a transformer 50 of the ringer 15 and conductor 51 of the MTG cord also extends from the terminal block 46. Terminal 52 of the transformer 50 is connected by a conductor 53 to a terminal block 54 and terminal 55 of a transformer 56 of the ringer 15 is connected by a conductor 57 to terminal block 58. Terminal 59 of the transformer 56 is connected by a conductor 60 to a terminal block 61 and a conductor 62, forming a part of the MTG cord, extends from the terminal block 61.

In this circuit the terminal blocks 18, 19, 22, 33, 36, 40, 44, 45, 46, 54 and 61 are mounted on a network panel 63. It will be understood that this network panel has wiring (not shown) on its back side, which wiring severally interconnects the hand set terminal blocks 18, 19, and 22, the line terminal blocks 36 and 44, and the terminal blocks 33 and 36 for the dial operated pulse sending circuit maker and breaker 32.

In the service hookup of FIG. 1 when the handset 10 has been removed from the support 13, a connection is made to the central office and a call is made or completed. If after the connection has been broken the handset is not replaced on the support 13, no other party can use the line. When a call is made to the central office by a subscriber on another line to a line where a receiver-off-hook condition exists, the trouble man will test each loop of a party line by a test shoe. The test shoe will indicate the receiver-off-hook condition and the trouble man will try to contact the subscriber by the Howler Method. Should the trouble man be unable to get a response from the subscriber, a current of sufficient amperes to blow the fuse 9 is sent through the party loop having the receiver-off-hook condition. It will be noted that the current required to blow the fuse 9 is less than that required to blow the fuses in the ordinary house protectors, which latter usually blow at seven amperes. Upon the blowing of the fuse 9 in the subscriber's loop the line will be opened and the other subscribers will be able to use their phones. When the subscriber reports his phone out of service, the trouble man will visit the subscriber and replace the fuse 9, placing the line again in service. Repetition of this interruption in service will train all subscribers to be certain that the handset 11 is on the support 13.

The invention, therefore, contemplates the interposition of a fuse of low ampere rating in series with switch within a support 13 and it is believed that the manner of installing the fuse, as well as the subsequent operation contemplated by the invention, will be apparent to those skilled in the art.

It is also to be understood that changes in the minor details of the circuits and the manner of connecting the invention with the circuit may be resorted to provided such changes fall within the spirit of the invention and the scope of the appended claim.

Having thus described the invention what is claimed as new and desired to be secured by Letters Patent is:

A circuit arrangement for intentionally disconnecting a subscriber's station including a hand set having a receiving end and a transmitting end connected in a bridge circuit, a support upon which said hand set normally rests, a pair of circuit making and breaking devices in said support held closed by the hand set when in position on the latter, and a dial operated pulse sending circuit maker and breaker on said support, from a telephone line; comprising a network panel having a plurality of terminals thereon with the telephone line connected to two of said terminals, conductors connecting the bridge circuit of the hand set to other terminals on the network panel, conductors connecting the dial operated pulse sending circuit maker and breaker to still other terminals on the network panel, a fuse of low ampere rating, and a circuit for connecting the bridge circuit of the hand set and the fuse across the telephone line comprised on one side by a conductor from one terminal for the telephone line to one side of a first circuit maker and breaker in the support, a conductor from the other side of the first circuit maker and breaker to one terminal corresponding to a first terminal for the handset, and on the other side by a conductor from the other terminal for the telephone line to one side of the other circuit maker and breaker in the support, a conductor from the other side of the latter circuit maker and breaker to the fuse, a conductor from the fuse to one of the terminals to which a conductor from the dial operated pulse sending circuit maker and breaker is connected, over the latter conductor, through the dial operated pulse sending circuit maker and breaker, and over the other conductor from the dial operated pulse sending circuit maker and breaker to still another terminal corresponding to a second terminal for the handset, whereby a heavy current may be sent over the telephone line to blow the fuse and open the circuit through the circuit making and breaking devices in the support with the handset off the latter.

References Cited in the file of this patent

UNITED STATES PATENTS

| | | |
|---|---|---|
| 835,181 | Davidson | Nov. 6, 1906 |
| 1,145,632 | Ude | July 6, 1915 |
| 1,350,737 | Riess | Aug. 24, 1920 |
| 1,436,570 | Bohac | Nov. 21, 1922 |
| 2,106,902 | Sands | Feb. 1, 1938 |

OTHER REFERENCES

Mitchell: Principles and Practice of Telephony; McGraw-Hill, 1923; pp. 112 and 116.

Western Electric Co., Telephone Sets No. 1317 type; page 8.